United States Patent
Crowder

(10) Patent No.: US 12,003,808 B2
(45) Date of Patent: *Jun. 4, 2024

(54) CACHE MANAGEMENT IN CONTENT DELIVERY SYSTEMS

(71) Applicant: Level 3 Communications, LLC, Broomfield, CO (US)

(72) Inventor: William Crowder, Camarillo, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,861

(22) Filed: Oct. 16, 2022

(65) Prior Publication Data

US 2023/0034398 A1 Feb. 2, 2023

Related U.S. Application Data

(63) Continuation of application No. 17/493,880, filed on Oct. 5, 2021, which is a continuation of application
(Continued)

(51) Int. Cl.
*H04N 21/433* (2011.01)
*G06F 16/955* (2019.01)
(Continued)

(52) U.S. Cl.
CPC ......... *H04N 21/433* (2013.01); *G06F 16/955* (2019.01); *H04L 63/08* (2013.01);
(Continued)

(58) Field of Classification Search
CPC ..... H04N 21/433; H04L 63/08; H04L 65/612; H04L 67/025; H04L 67/2871; H04L 67/2885; H04L 67/568
See application file for complete search history.

(56) References Cited

U.S. PATENT DOCUMENTS

| | | | |
|---|---|---|---|
| 2002/0162109 A1* | 10/2002 | Shteyn | H04N 21/2747 725/38 |
| 2006/0015574 A1* | 1/2006 | Seed | H04L 67/563 709/219 |

(Continued)

FOREIGN PATENT DOCUMENTS

EP 3249545 11/2017

OTHER PUBLICATIONS

Canadian Examination Report, dated Jun. 1, 2023, Application No. 3140109, filed Mar. 12, 2020; 3 pgs.
(Continued)

*Primary Examiner* — Rong Le

(57) ABSTRACT

Examples described herein relate to apparatuses and methods for managing caching for a content delivery system, which may include receiving a content request indicating that the caching agent is requesting content data for a client, filling the content data in a first cache storage of the business logic agent, providing the cached content data to the caching agent, and while a second cache storage of the caching agent is being filled with the content data, maintaining the cached content data in response to receiving additional content requests from the caching agent. The additional content requests may indicate that the caching agent is requesting the same content data for additional clients.

24 Claims, 5 Drawing Sheets

Related U.S. Application Data

No. 16/817,557, filed on Mar. 12, 2020, now Pat. No. 11,146,848.

(60) Provisional application No. 62/847,890, filed on May 14, 2019.

(51) Int. Cl.
  *H04L 9/40* (2022.01)
  *H04L 65/612* (2022.01)
  *H04L 67/025* (2022.01)
  *H04L 67/568* (2022.01)

(52) U.S. Cl.
  CPC .......... *H04L 65/612* (2022.05); *H04L 67/025* (2013.01); *H04L 67/568* (2022.05)

(56) References Cited

U.S. PATENT DOCUMENTS

| | | | |
|---|---|---|---|
| 2007/0250560 A1* | 10/2007 | Wein | H04L 63/08 709/201 |
| 2008/0059721 A1 | 3/2008 | Turner | |
| 2008/0235161 A1 | 9/2008 | Salomen | |
| 2014/0372589 A1* | 12/2014 | Newton | H04L 67/60 709/223 |
| 2015/0127766 A1 | 5/2015 | Puthalath | |
| 2016/0110284 A1 | 4/2016 | Athalye | |
| 2020/0221338 A1* | 7/2020 | Luna | H04W 52/0258 |
| 2020/0366954 A1 | 11/2020 | Crowder | |
| 2022/0030297 A1 | 1/2022 | Crowder | |

OTHER PUBLICATIONS

International Preliminary Report on Patentability, dated Nov. 25, 2021, Int'l Appl. No. PCT/US20/022490, Int'l Filing Date Mar. 12, 2020; 10 pgs.

International Search Report and Written Opinion of the International Searching Authority, dated Jun. 17, 2020, Int'l Appl. No. PCT/US20/022490; Int'l Filing Date Mar. 12, 2020; 11 pgs.

Saudi Arabian Examination Report, dated Dec. 26, 2023, Application No. 521430818, filed Mar. 12, 2020; 11 pgs.

Singapore Examination Report, dated Mar. 11, 2024, Application No. 11202112137P, filed Mar. 12, 2020; 10 pgs.

* cited by examiner

CACHE MANAGEMENT IN CONTENT DELIVERY SYSTEMS

BACKGROUND

A content delivery system or network (e.g., a content delivery network (CDN)) is a geographically distributed network of servers configured for facilitating an origin server to distribute content data (e.g., videos, images, website content data, and so on) of the origin server to clients that consume the content data. Each server in the content delivery system can be referred to as a node, a machine, and so on. To distribute the content data from the origin server to clients that are geographically remote to the origin server, a node in geographical proximity to the clients can provide the content data to those clients on behalf of the origin server. In particular, the CDN can replicate and cache the content data of the origin server and provide the replicated and cached content data to the clients.

BRIEF SUMMARY

Provided herein are systems, apparatuses, and methods for managing caching for a content delivery system, which may include receiving, by a business logic agent from a caching agent, a content request indicating that the caching agent is requesting content data for a client, wherein the business logic agent and the caching agent are operatively coupled via a network, filling, by the business logic agent, the content data in a first cache storage of the business logic agent, wherein the content data is received from an upstream node of the content delivery system, providing, by the business logic agent, the cached content data to the caching agent, and while a second cache storage of the caching agent is being filled with the content data, maintaining, by the business logic agent, the cached content data in response to receiving additional content requests from the caching agent, wherein the additional content requests indicate that the caching agent is requesting the same content data for additional clients.

The content delivery system may be a CDN. The business logic agent and the caching agent may be on the same edge node of the CDN. The upstream node is preferably an origin server that stores the content data or a node between the edge node and the origin node in the CDN that stores the content data. The network may be a local host connection. The local host connection may be over at least one of a hypertext transfer protocol (HTTP) connection and a HTTP/2 connection.

Alternatively, the caching agent is on an edge node of the CDN, and the business logic agent is on an intermediate node of the CDN. The intermediate node is preferably different from the edge node.

The caching agent may include a HTTP service engine configured to service HTTP requests received from clients. The caching agent may include a caching engine. The caching engine may include the second cache storage.

Embodiments further allow receiving, by the business logic agent from the caching agent, an authentication request before the content request is received, authenticating that the content data is provided by a customer of the content delivery system, and sending, by the business logic agent to the caching agent, an authentication response in response to authenticating that the content data is provided by the customer, wherein the authentication response comprises an authorization.

The content request may identify the upstream node. The business logic agent may receive the content data from the upstream node based on the content request. The content request may be addressed to the upstream node.

The content request may include an address of the content data and a range of the content data. The address of the content data may include a Uniform Resource Locator (URL). The business logic agent can determine whether any of the additional content requests is requesting the same content data as requested by the content request based on the address and the range.

The content request may include a fill identification (ID), and the method further may include determining, by the business logic agent, that a new copy of the content data is needed based on the fill ID, and filling, by the business logic agent, the new copy of the content data in the first cache storage in response to determining that the new copy is needed.

The content request may include a conditional request header, and the method further allows determining, by the business logic agent, a key corresponding to the content request based on the conditional request header.

Embodiments further allow, while the second cache storage of the caching agent is being filled with the content data, maintaining the cached content data to include maintaining the cached content data in response to determining that two consecutive ones of the additional content requests are received within a predetermined time interval.

Embodiments further allow determining that no new additional content requests have been received for a predetermined time interval since a most recent one of the additional content requests has been received.

In accordance with another aspect, systems, apparatuses, and methods for managing caching for a content delivery system may include receiving, by a caching agent from a client, a request for content data, determining, by the caching agent, that the caching agent needs to fill the content data, sending, by the caching agent to a business logic agent, a content request indicating that the caching agent is requesting the content data for the client, wherein the business logic agent and the caching agent are operatively coupled via a network, and the business logic agent fills the content data in a first cache storage of the business logic agent responsive to the content request, filling, by the caching agent, the content data from an upstream node in a second cache storage of the caching agent, receiving, by the caching agent, additional content requests from additional clients, wherein the additional content requests indicate that the same content data is requested by additional clients, and while the second cache storage is being filled with the content data, the cached content data is provided by the business logic agent to the additional clients.

Embodiments further allow selecting, by the caching agent, the upstream node, wherein the content request identifies the upstream node.

These and other features, together with the organization and manner of operation thereof, will become apparent from the following detailed description when taken in conjunction with the accompanying drawings.

DETAILED DESCRIPTION

Figure 1A:
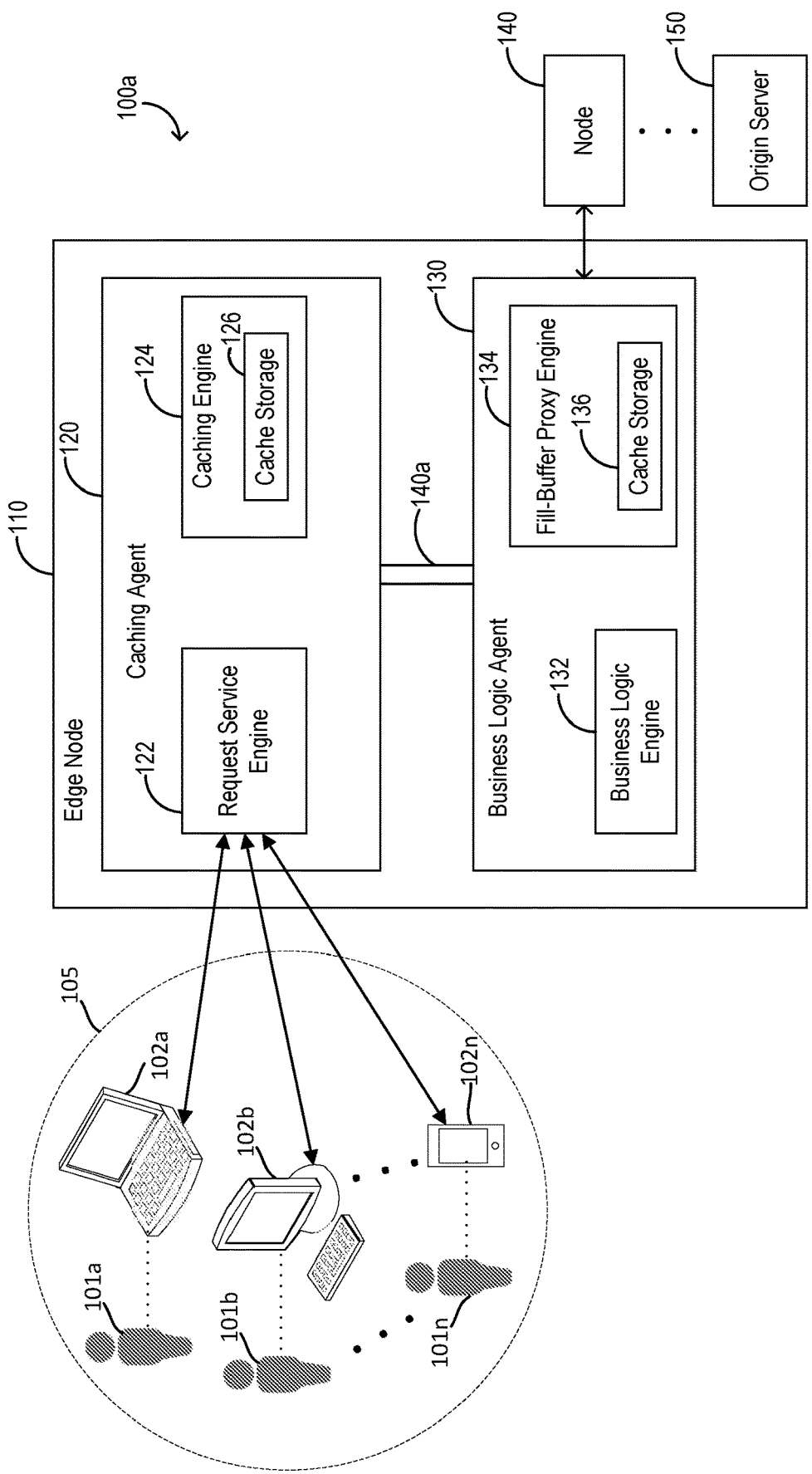
FIG. 1A is a diagram of a content delivery system according to some embodiments.

Embodiments described herein relate to systems, apparatuses, and methods for cache management in a content delivery system (e.g., a CDN). In a content delivery system, an edge node is a node that initially receives a request for content data from a client. The client refers to a device operated by an end user who desires to consume or otherwise receive the content data provided by the origin server. The content data refers to a portion, a segment, an object, a file, or a slice of data stored by the origin server and cached throughout the content delivery system for provisioning to the clients. The origin server refers to a device operated by a customer of the content delivery system, which facilitates the customer in delivering the content data to the clients. Nodes of a content delivery system can be organized in a caching hierarchy for caching content data requested by clients.

In some implementations, the edge node has two separate agents provided thereon for caching and business logic functionalities. For example, a caching agent is configured to process the requests for content (e.g., hypertext transfer protocol (HTTP) requests) received from clients, and receive and cache the requested content data in case additional clients request the same content data, for example, if the content data (e.g., at least a portion of a video) is popular and is frequently requested. A business logic agent is configured to implement business logic for the edge node. For example, the business logic agent can determine whether the content data requested belongs to a customer of the content delivery system, whether the content delivery system can deliver the content data to the client requesting the content data (assuming the content data belongs to a customer of the content delivery system), and so on. Preferably, the caching agent and the business logic agent have different functionalities and are implemented as separate agents. In other words, the business logic agent is external to the caching agent, and vice versa.

In accordance with some aspects, upon receiving a request for content data from a client, the caching agent obtains authorization from the business logic agent, allowing the request to be serviced. Next, the caching agent determines whether the requested content data is already stored in a cache local to the caching agent. Responsive to determining that the cache local to the caching agent does not store the content data, the caching agent determines that the cache local to the caching agent needs to be filled with the content data to serve future requests received from additional clients. In order to satisfy the request, the caching agent fetches the content data from the origin server or another upstream node that stores or caches the content data and performs a cache fill (e.g., filling the cache local to the caching agent with the content data). The caching agent can provide to the client a copy of the content data stored in the cache local to the caching agent.

In a low latency environment, as the caching agent performs a cache fill, the caching agent may enable a cache lock. With the cache lock on, any additional requests (from additional clients) for the same content data are placed on hold until the cache fill is completed. This means that while the first client that first requests the content data (before the additional clients) may obtain the content data immediately (e.g., as the cache fill is in progress), the additional clients that request the same content data will not obtain any of the content data until the cache fill is completed, until the cache lock is disabled, and until the first client obtains all the content data.

Traditionally, the caching agent does not have any fill-in-progress features that allows servicing of the additional requests before the cache fill at the caching agent is completed (before the cache lock is disabled). In some traditional implementations of the caching agent, the caching agent does not have sufficient signaling mechanism to efficiently implement any fill-in-progress features. Some traditional implementations of the caching agent allow the additional clients to poll to determine whether the cache lock has been released. The poll interval (e.g., 500 ms) may be set to avoid frequent polling which wastes central processing unit (CPU) cycles. In that regard, time is wasted if the cache lock is disabled long before a given poll interval expires. The time needed to perform the cache fill may also vary based on a size of the content data (e.g., resource size) such that polling cannot be implemented efficiently.

Moreover, some traditional implementations of the caching agent direct the additional clients to connect to the origin server or another upstream node that already has the content data stored/cached while the cache lock is enabled so that the additional clients can obtain the content data directly from the original server or the upstream node. Given that the content delivery system is a geographically distributed network, the connections between the additional clients and the origin server or another upstream node over the distributed network may require a significant amount of bandwidth, may exacerbate traffic within the content delivery system, may swamp the customer's origin server, and so on.

Embodiments described herein improve cache management in traditional content delivery systems that implement a caching agent (for processing requests from clients and for caching content data) and a business logic agent (for implementing business logics such as authentication). For example, while the caching agent has a cache lock enabled as a cache local to the caching agent is being filled with requested content data, the business logic agent maintains a copy of the content data in a cache local to the business logic agent. Additional requests for the same content data received by the caching agent can be serviced using the copy of the content data stored in the cache local to the business logic agent while the cache local to the caching agent is unavailable to service those requests due to the cache lock. Accordingly, the cache local to the business logic agent may act as an intelligent fill-buffering proxy for the caching agent during the cache lock.

FIG. 1A is a diagram of a content delivery system 100a according to some embodiments. Referring to FIG. 1A, the content delivery system 100a is configured for delivering content data provided by an origin server 150 to various clients 102a-102n. As shown, each of the users 101a-101n operates or is associated with a respective one of the clients 102a-102n for accessing the content data or services provided by the origin server 150. In some embodiments, each of the clients 102a-102n can be a desktop computer, mainframe computer, laptop computer, pad device, smart phone device, or the like, configured with hardware and software to perform operations described herein. For example, each of the clients 102a-102n includes at least a processing circuit, a network device, and a user interface. The processing circuit is configured to perform functions of the clients 102a-102n described herein. The network device is configured to connect the clients 102a-102n to a node (e.g., an edge node 110) of the content delivery system 100a. The user interface is configured for outputting (e.g., displaying media content, games, information, and so on) based on the content data as well as receiving user input from the users 101a-101n.

In some examples, the content delivery system 100a corresponds to a CDN for delivering and distributing the content data originating from the origin server 150 to the clients 102a-102n. For example, the content delivery system 100a includes nodes 110, 140, . . . , and 150, where the origin server 150 is connected to at least one node (not shown), one of the at least one node is connected to the node 140, and the node 140 is connected to the edge node 110. The origin server 150, the node 140, the edge node 110, and other nodes in the content delivery system 100a not shown can be located in different locations, thus forming the geographically distributed content delivery system 100a. While there can be additional nodes between the node 140 and the origin server 150, the node 140 can be directly connected to the origin server 150, or the node 140 can be the origin server 150.

The content data of the origin server 150 can be replicated and cached in multiple locations (e.g., multiple nodes) throughout the content delivery system 100a, including in the node 140 and other nodes (not shown). As used herein, the node 140 refers to any node in the content delivery system 100a (between the origin server 150 and the edge node 110) that stores a copy of the content data provided by the origin server 150. The origin server 150 refers to the source of the contents data. The origin server 150 can belong to a customer (e.g., a content owner, content publisher, or a subscriber of the system 100a) of the content delivery system 100a such that the customer pays a fee for using the content delivery system 100a to deliver the content data. Examples of the content data include but are not limited to, webpages and web objects (e.g., text, graphics, scripts, and the like), downloadable objects (e.g., media files, software, documents, and the like), live streaming media, on-demand streaming media, social networks, and applications (e.g., online multiplayer games, dating applications, e-commerce applications, portals, and the like), and so on.

The nodes 110, 140, and other nodes (not shown) between the edge node 110 and the origin server 150 form a "backbone" of the content delivery system 100a, providing a path from the origin server 150 to the clients 102a-102n. The node 140 is upstream with respect to the edge node 110 given that the node 140 is between the edge node 110 and the origin server 150. The nodes making up a backbone may be dynamically or statically selected based on the location of those nodes, taking into consideration a number hops or links from the origin server 150 to the clients 102a-102n, latency, availability, cost, and other suitable criteria.

In some embodiments, the edge node 110 is referred to as an "edge node" given the proximity of the edge node 110 to the clients 102a-102n. For example, the clients 102a-102n that are in an area 105 may be associated with and connected to the edge node 110 given the proximity of the edge node 110 to the clients 102a-102n. In other words, the edge node 110 is on the edge of the content delivery system 100a, and the edge node 110 is directly connected to the clients 102a-102n. Typically, the closer an edge node is to clients connected thereto, the less latency those clients experience with respect to receiving the content data from that edge node. Thus, performance is contingent upon the geographical proximity of the edge node 110 to the clients 102a-102n. CDN providers typically place the edge nodes as close to intended clients as possible. Thus, the edge node 110 can be located within the area 105. In some embodiments, the edge node 110 may be directly connected to the origin server 150.

In some embodiments, the node 140 (and other nodes between the node 140 and the origin server 150 not shown) is referred to as an "intermediate node." The intermediate nodes link the edge nodes to the origin server 150 via various network links or "hops." The intermediate nodes can provide the content data (and updates thereof) to the edge nodes. That is, the origin server 150 can provide the content data (and updates thereof) to the edge node 110 through the node 140, if the edge node 110 does not currently cache a copy of the content data requested by the clients 102a-102n.

Each link between one of the clients 102a-102n and the edge node 110 corresponds to a suitable network connection for exchanging data. In addition, each link between two of the nodes/servers 110, 140, . . . , and 150 represents a suitable network connection for exchanging data. A network connection is structured to permit the exchange of data, values, instructions, messages, and the like among the clients 102a-102n, the nodes 110, 140, and so on, and the origin server 150 in the manner shown. The network connection can be any suitable Local Area Network (LAN) or Wide Area Network (WAN) connection. For example, each network link can be supported by Frequency Division Multiple Access (FDMA), Time Division Multiple Access (TDMA), Synchronous Optical Network (SONET), Dense Wavelength Division Multiplexing (DWDM), Optical Transport Network (OTN), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like.

As shown, the edge node 110 includes a caching agent 120 and a business logic agent 130. The caching agent 120 can be an open-source platform and is configured to process requests for content (e.g., HTTP requests) received from the clients 102a-102n, and receive and cache the requested content data in case additional clients request the same content data. In that regard, the caching agent 120 includes a request service engine 122 and a caching engine 124.

An example of the request service engine 122 is a HTTP service engine configured to receive and process HTTP requests received from the clients 102a-102n. The request service engine 122 is configured for suitable protocols (e.g., HTTP) for receiving and processing the HTTP request. In other words, the request service engine 122 is configured to answer the HTTP requests from the end users 101a-101n in the manner described.

The caching engine 124 is configured to implement caching by the caching agent 120. For example, the caching engine 124 includes or is operatively coupled to a cache storage 126. The cache storage 126 is local to the caching engine 124 and to the caching agent 120. Content data cached by the caching agent 120 (e.g., by the caching engine 124) is stored in the cache storage 126.

The business logic agent 130 is configured to implement business logics at the edge node 110. For example, the business logic agent 130 includes a business logic engine 132. The business logic engine 132 is configured for authentication, providing business information to the caching agent 120 to allow the caching agent 120 to maintain correct statistics and logs, calculating cache key, and so on. For example, the business logic engine 132 is configured to determine whether the content data requested by the clients 102a-102n belongs to a valid customer of the content delivery system 100a, whether the rules of the customer allow the content data to be serviced to the clients 102a-102n, whether the rules of the content delivery system 100a allow the content data to be serviced to the clients 102a-102n, and so on.

Furthermore, the business logic agent 130 includes a fill-buffer proxy engine 134 configured to implement an intelligent fill-buffering proxy for the caching agent 120 when the content data stored in the cache storage 126 is cache locked. For example, the fill-buffer proxy engine 134 includes or is operatively coupled to a cache storage 136. The cache storage 136 is local to the fill-buffer proxy engine 134 and to the business logic agent 130. Content data cached by the business logic agent 130 (e.g., by the fill-buffer proxy engine 134) is stored in the cache storage 136. The business logic agent 130 including both the business logic engine 132 and the fill-buffer proxy engine 134 indicates that both authentication and fill-buffering services can be implemented on a same process, by virtue that a same connection opened by the business logic agent 130 is used for both authentication and fill-buffering by both the business logic engine 132 and the fill-buffer proxy engine 134. Alternatively, the business logic engine 132 and the fill-buffer proxy engine 134 can be executed on separate processes on a node (e.g., the edge node 110 or the node 111).

As shown in FIG. 1A, the caching agent 120 and the business logic agent 130 are provided on a same node (the edge node 110), same server, same computer, same "box," and so on. The caching agent 120 and the business logic agent 130 have different functionalities and are implemented as separate agents. The caching agent 120 and the business logic agent 130 are implemented by the processing and storage capabilities of the same edge node 110. In other words, the business logic agent 130 is external to the caching agent 120 on the same edge node 110, vice versa. Providing the two agents 120 and 130 on the same edge node 110 allow separation of the request servicing/caching logic and the business logic, thus providing granularity for managing the separate logics and for providing updates to the software. In some examples in which the caching agent 120 already has upstream target selection capabilities, there is no need to replicate upstream target selection at the business logic agent 130. If it has been detected that the business logic agent 130 is faulty, the fill-buffer capabilities as described herein can be released or removed from the business logic agent 130, and the cache lock features can address multiple requests for a same content data with cache lock enabled (although less efficient).

As shown in FIG. 1A, the caching agent 120 and the business logic agent 130 are operatively coupled to one another via a network 140a. In some examples, the network 140a is a local host connection configured to provide communications for two agents on a same node. In some examples, the local host connection is a HTTP connection, a HTTP/2 connection, a transmission control protocol (TCP) connection, and so on. In some examples, the local host connection is peripheral component interconnect (PCI) connection in the embodiments in which the caching agent 120 and the business logic agent 130 are implemented on different hardware (e.g., different processors, different memories, and so on) of the edge node 110. Therefore, the network 140a is an intra-node network connection.

As described in further detail herein, the present disclosure improves the dual-agent scheme by leveraging the connection via the network 140a between the caching agent 120 and the business logic agent 130 for both authentication as well as fill-buffering. A separate connection is opened for each request received by the request service engine 122 from one of the clients 102a-102n. Multiple requests (e.g., the authentication request, the content request, and so on) for authentication and fill-buffering proxy with respect to a same request received by the request service engine 122 from one of the clients 102a-102n can be communicated and serviced serially on the same connection. In other words, this is connection is "kept-alive." In some examples, multiplexed servicing of multiple authentication requests and content requests can be allowed on the same connection, e.g., as would be the case with the HTTP/2 implementation.

Figure 1B:
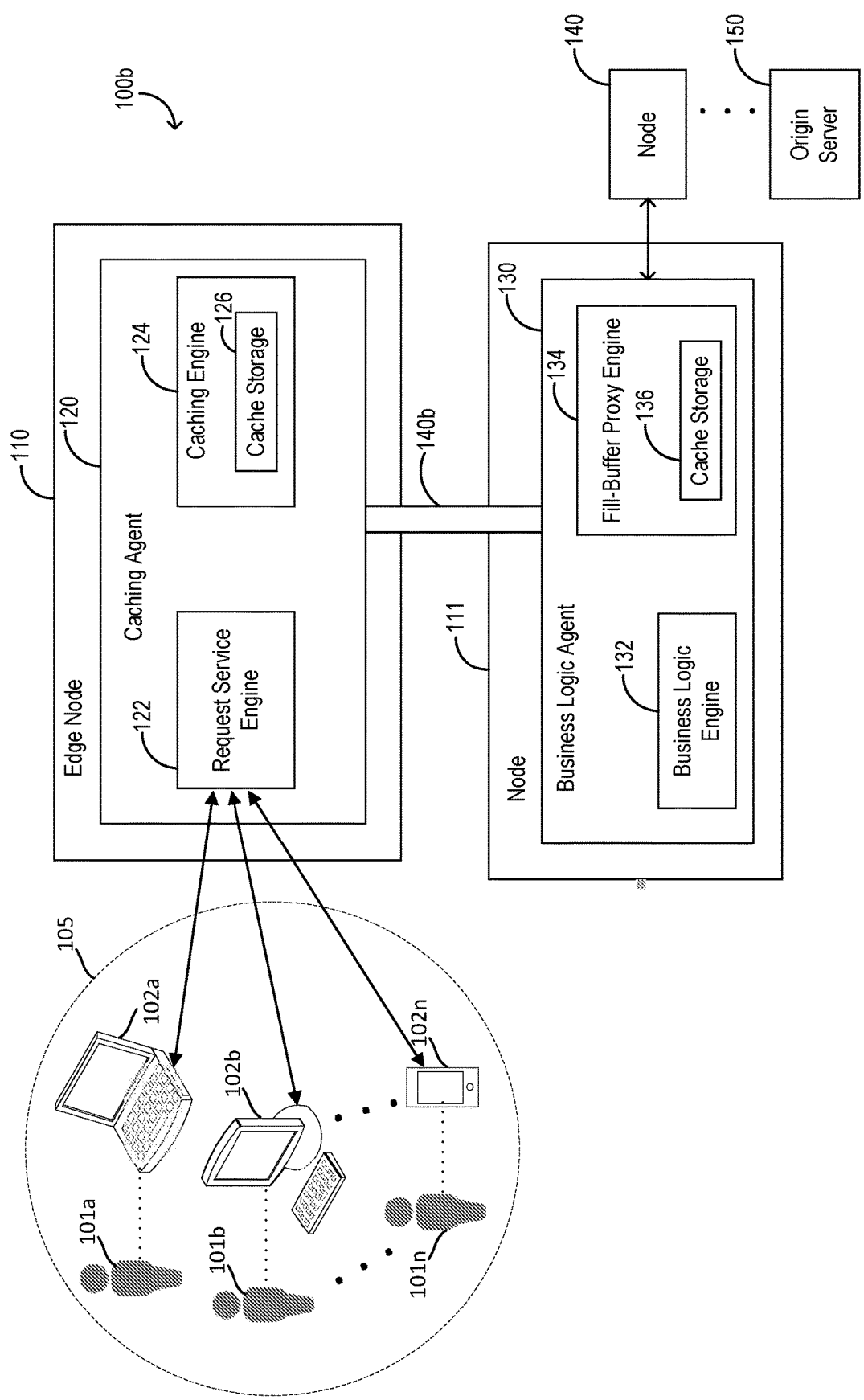
FIG. 1B is a diagram of a content delivery system according to some embodiments.

FIG. 1B is a diagram of a content delivery system 100b according to some embodiments. Referring to FIGS. 1A and 1B, the content delivery system 100b is configured for delivering content data provided by the origin server 150 to various clients 102a-102n. The content delivery system 100b is similar to the content delivery system 100a, but differs from the content delivery system 100a in that in the content delivery system 100b, the caching agent 120 and the business logic agent 130 are provided on different nodes 110 and 111. For example, the caching agent 120 can be provided on the edge node 110 for request servicing and caching functionalities, and the business logic agent 130 is provided on another node 111 for business logic functionalities. The nodes 111 and 140 are upstream nodes to the edge node 110.

The caching agent 120 and the business logic agent 130 are operatively coupled via a network 140b. The network 140b is structured to permit the exchange of data, values, instructions, messages, and the like between the caching agent 120 and the business logic agent 130. The network 140b can be any suitable LAN or WAN connection. For example, the network 140b can be supported by FDMA, TDMA, SONET, DWDM, OTN, CDMA (particularly, EVDO), UMTS (particularly, TD-SCDMA or TDS WCDMA, LTE, eMBMS, HSDPA, and the like), UTRA, GSM, 1×, GPRS, PCS, 802.11X, ZigBee, Bluetooth, Wi-Fi, any suitable wired network, combination thereof, and/or the like. Therefore, the network 140b is an inter-node network connection.

While one node (the edge node 110) is shown to be connected to the node 111, one or more additional edge nodes (such as but not limited to, the edge node 110) can be connected to the node 111. In other words, multiple edge nodes configured for request servicing and caching can be connected to a same intermediate node configured for business logic. Such node deployment allow efficient allocation of hardware. For example, the edge node 110 with the caching agent 120 may have larger storage capability and lesser compute capability given that the edge node 110 is concerned with caching. In some examples, basic compute can be provided to the edge node 110 for HTTP processing. The node 111 with the business logic agent 130 may have larger compute capability and lesser storage capability given that the node 111 is concerned with the business logic (e.g., authentication, rule checks, and so on).

In some examples, the fill-buffering proxy engine 134 can be separate from the business logic engine 132. For example, the fill-buffering proxy engine 134 and the business logic engine 132 can be separate processes/applications operating on a same node. Alternatively, the fill-buffering proxy engine 134 and the business logic engine 132 can be separate processes/applications operating on different nodes and connected via a suitable network. In such embodiments, an indication can be included in the authentication request indicating whether only authentication/metadata is requested (e.g., the caching engine 124 already has a copy of the content data) or whether (assuming successful authentication) the content data should be retrieved as well.

Figure 2:
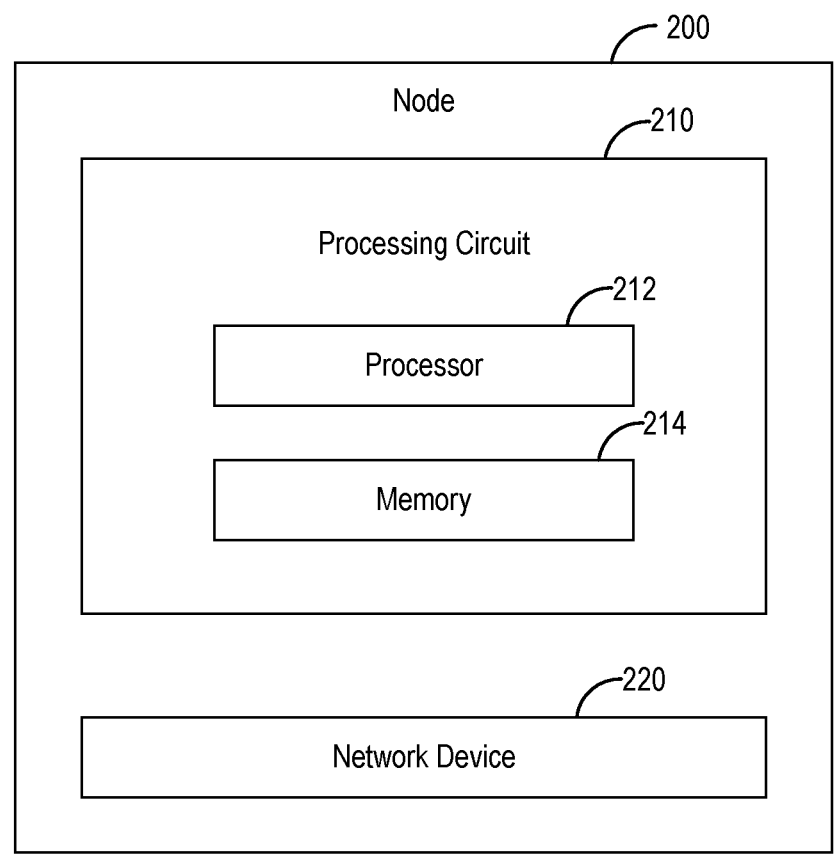
FIG. 2 is a block diagram that illustrates a node according to some embodiments of the present disclosure.

FIG. 2 is a block diagram that illustrates a node 200 according to some embodiments. Referring to FIGS. 1A-2, the node 200 is a non-limiting example of the nodes 110, 111, 140, and nodes (if any) between the node 140 and the origin server 150 in some embodiments. As shown, the node 200 includes one or more of a processing circuit 210 and a network device 220.

The processing circuit 210 is configured to perform various functions described herein relative to the node 200. The processing circuit 210 includes a processor 212 and a memory 214. The processor 212 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 214 can be implemented with a Random Access Memory (RAM), Read-Only Memory (ROM), Non-Volatile RAM (NVRAM), flash memory, hard disk storage, or another suitable data storage unit. The memory 214 stores data and/or computer code for facilitating the various processes executed by the processor 212. Moreover, the memory 214 is or includes tangible, non-transient volatile memory or non-volatile memory. Accordingly, the memory 214 includes database components, object code components, script components, or any other type of information structure for supporting the various functions described herein.

In some examples, the processing circuit 210 of the edge node 110 (FIG. 1A) is configured to implement the caching agent 120 and the business logic agent 130 as separate agents on the edge node 110. The memory 214 of the edge node 110 (FIG. 1A) can be used to implement the cache storages 126 and 136 as separate storages operatively coupled to separate agents. In one example, the cache storages 126 and 136 correspond to separate petitions on the memory 214. In another example, the memory 214 may include separate memory devices, each connected to other components of the edge node 110 (FIG. 1A) via a suitable internal bus. The cache storage 126 is implemented on a first one of the separate memory devices, and the cache storage 136 is implemented on a second one of the separate memory devices.

In some examples, the processing circuit 210 of the edge node 110 (FIG. 1B) is configured to implement the caching agent 120, and the processing circuit 210 of the node 111 (FIG. 1B) is configured to implement the business logic agent 130. The memory 214 of the edge node 110 (FIG. 1B) can be used to implement the cache storage 126, and memory 214 of the node 111 (FIG. 1B) can be used to implement the cache storage 136.

The network interface 220 is structured to establish communication with clients (e.g., the clients 102a-102n), other nodes in the content delivery system 100a or 100b, and/or the origin server 150. In some examples, the network interface 220 is configured to establish the network 140a or 140b. The network interface 220 includes hardware and software for achieving such. In some implementations, the network interface 220 includes a cellular transceiver (configured for cellular standards), a local wireless network transceiver (for 802.11X, ZigBee, Bluetooth, Wi-Fi, or the like), a wired network interface, a combination thereof (e.g., both a cellular transceiver and a Bluetooth transceiver), and/or the like.

Figure 3A:
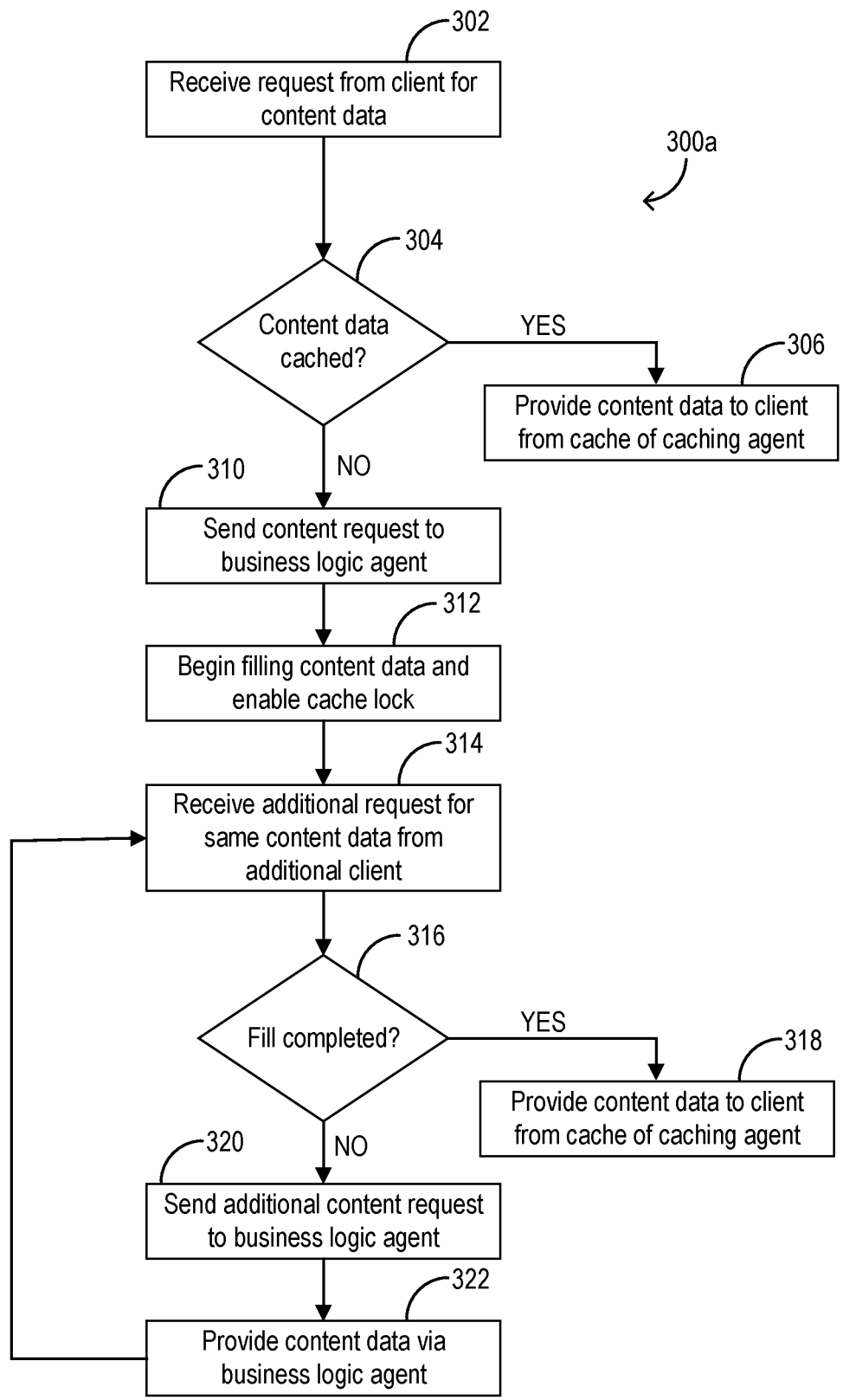
FIG. 3A is a flow diagram illustrating a method for managing caching for the content delivery system according to various embodiments.

FIG. 3A is a flow diagram illustrating a method 300a for managing caching for the content delivery system 100a or 100b according to various embodiments. Referring to FIGS. 1A-3A, the method 300a is concerned with leveraging the cache storage 136 of the business logic agent 130 for intelligent fill-buffering for the caching agent 120 with respect to content data for which the caching agent 120 has enabled a cache lock. The method 300a is performed by the caching agent 120.

At 302, the caching agent 120 (e.g., the request service engine 122) receives a request for content data from the client 102a. An example of the request is an HTTP request. The request can be received from the cloud and/or from the internet. The client 102a refers to a first one of the clients 102a-102n that is requesting the content data from the edge node 110 for the method 300a.

In some examples, responsive to receiving the request, the caching agent 120 (e.g., the request service engine 122) opens a connection corresponding to that particular request in the network 140a or 140b. For example, the request service engine 122 can open a port corresponding to the request received from the client 102a in the local host network (e.g., the network 140a) for communicating the request-related data with the business logic agent 130. In another example, the request service engine 122 can open a dedicated connection corresponding to the request received from the client 102a in the network 140b for communicating request-related data with the business logic agent 130.

The caching agent 120 (e.g., the request service engine 122) sends an authentication request to the business logic engine 132 via the network 140a (e.g., via the opened port) or 140b (e.g., via the dedicated connection) to authenticate the request received from the client 102a. The business logic engine 132 is configured to determine whether the content data requested by the client 102a belongs to a valid customer of the system 100a or 100b, whether the rules of the customer allow the content data to be serviced to the client 102a, whether the rules of the content delivery system 100a or 100b allow the content data to be serviced to the client 102a, and so on. The request service engine 122 receives an authentication response from the business logic engine 132. The authentication response indicates to the request service engine 122 whether the request received from the client 102a can be serviced (e.g., "yes" or "no"). In some examples, in addition to the indication of whether the request can be serviced, the authentication response can include metadata such as but not limited to, server identification (ID), subscriber ID, cache key to use, and so on. In response to determining that the request received from the client 102a cannot be serviced based on the authentication response, the request service engine 122 respond to the client 102a accordingly.

On the other hand, in response to determining that the request received from the client 102a can be serviced based on the authentication response, the caching engine 124 determines whether the caching agent 120 needs to fill the content data. For example, at 304, the caching engine 124 determines whether the requested content data is cached in the cache storage 126. Responsive to determining that the content data is cached in the cache storage 126 (304: YES), the caching agent 120 provides the content data to the client 102a from the cache storage 126 of the caching agent 120, at 306.

On the other hand, in response to determining that the content data is not cached in the cache storage 126 (304: NO), the caching agent 120 (e.g., the caching engine 124) sends a content request to the fill-buffer proxy engine 134 indicating that the caching agent 120 is requesting the content data for the client 102a, at 310. The content request can be sent via the port or connection established in the network 140a or 140b (as dedicated to the request from the client 102a) for authentication.

In some examples, the content request includes an address of the content data and an address of an upstream node from which the content data is to be received/retrieved. In some examples, the address of the content data is a Uniform Resource Locator (URL). The upstream node is referring to a node that stores a copy of the content data requested by the host 102a. Examples of the upstream node includes the node 140 and the origin server 150. The caching engine 124 can select the upstream node. The caching engine 124 has suitable caching tools including but not limited to, upstream node selection tools (e.g., through consistent hashing), health status information to track health (e.g., latency, capacity, and so on) of the nodes of the systems 100a or 100b, and so on. The caching engine 124 can use such caching tools to identify a healthy upstream node that currently stores a copy of the content data for example, based on availability of the copy of the content data, latency, proximity to edge node 110 (e.g., in the system 100a and 100b), proximity to the node 111 (e.g., in the system 100b), latency, availability/health, and so on. The address of the upstream node can be a node/server ID, an IP address, and so on.

In some examples, the fill-buffer proxy engine 134 appears to be "transparent" to the caching agent 120. For example, a protocol can be implemented at the caching agent 120 (e.g., the caching engine 124) such that although the caching agent 120 configures the content request to be sent to the upstream node (according to the IP address of the upstream node), the protocol configures the caching agent 120 to connect instead to the fill-buffer proxy engine 134 using a known IP address of the fill-buffer proxy engine 134. In other words, the protocol converts the receiver address from the address of the upstream node to the known address of the fill-buffer proxy engine 134 while maintaining the address of the upstream node in the content request to the fill-buffer proxy engine 134. The fill-buffer proxy engine 134 does not perform node selection given that the caching agent 120 already has the caching tools available.

At 312, the caching engine 124 begins filling the content data in the cache storage 126 and enables cache lock in the cache storage 126 with respect to the content data. In some embodiments, responsive to receiving the content request, the fill-buffer proxy engine 134 connects to the upstream node identified in the content request and receives the content data from the upstream node. The fill-buffer proxy engine 134 begins to fill the content data in the cache storage 136 and relays the content data to the caching agent 120 via the port or connection of the network 140a or 140b. Accordingly, the cache storage 126 is being filled with the content data from the upstream node via the fill-buffer proxy engine 134, which is acting as a proxy or relay between the upstream node and the edge node 110. While the cache storage 126 is being filled with the content data, the cache lock with respect to the content data is enabled. As the cache storage 126 is being filled with the content data, the content data can be sent to the client 102a such that the client 102a does not need to wait until the entirety of the content data to be filled in the cache storage 126 before getting the content data. However, any additional requests for the same content data from another client cannot be serviced from the cache storage 126 as long as the cache lock is enabled.

At 314, the caching agent 120 receives an additional request for the same content data from an additional client 102b. Based on the request (e.g., an HTTP request), the caching agent 120 can determine that the additional request is for the same content but from a different client.

In some examples, responsive to receiving the additional request, the caching agent 120 (e.g., the request service engine 122) opens a connection corresponding to that particular request in the network 140a or 140b. For example, the request service engine 122 can open a port corresponding to the request received from the client 102b in the local host network (e.g., the network 140a) for communicating data with the business logic agent 130. The port is different from the port opened with respect to the request received at 302. In another example, the request service engine 122 can open a dedicated connection corresponding to the request received from the client 102b in the network 140b for communicating data with the business logic agent 130. The dedicated connection is different from the dedicated connection opened with respect to the request received at 302.

In some embodiments, the caching agent 120 (e.g., the request service engine 122) sends an authentication request to the business logic engine 132 via the network 140a or 140b to authenticate the request received from the client 102b, in a manner similar to described with respect to the request received at 302. The request service engine 122 receives an authentication response from the business logic engine 132, where the authentication response indicates to the request service engine 122 whether the request received from the client 102b can be serviced. As described, the authentication response can additionally include metadata such as but not limited to, server ID, subscriber ID, cache key to use, and so on. In response to determining that the request received from the client 102b cannot be serviced based on the authentication response, the request service engine 122 respond to the client 102b accordingly.

On the other hand, in response to determining that the request received from the client 102b can be serviced based on the authentication response, the caching engine 124 determines whether filling the content data at the cache storage 126 has completed (e.g., whether the cache lock has been disabled or released), at 316. Responsive to determining that the fill is completed and/or that the cache lock has been disabled or released (316: YES), the caching engine 124 provides the content data to the client using the cache storage 126, at 318.

On the other hand, responsive to determining that the fill is not completed and/or that the cache lock has not been disabled or released (316: NO), the cached content data is provided by the fill-buffer proxy engine 134 to the additional client 102b. The cached content data is provided by the fill-buffer proxy engine 134 to the client 102b while the cache storage 126 is being filled with the content data. For example, responsive to determining that the fill is not completed and/or that the cache lock has not been disabled or released (316: NO), the caching engine 124 is configured to send an additional content request to the fill-buffer proxy engine 134, at 320. The additional content request can be sent via the port or connection established in the network 140a or 140b (as dedicated to the client 102b) for authentication. The caching engine 124 can select the upstream node for this additional request in the manner described. Similar to the content request sent at 310, the additional content request includes an address of the content data and an address of an upstream node from which the content data is to be received/retrieved. As described, with respect to the additional content request, the fill-buffer proxy engine 134 appears to be "transparent" to the caching agent 120 in the manner described.

In some implementations, the systems 100a and 100b can employ large object slicing. Given that resources can be several gigabytes or more in size, the resources can be broken down or sliced into multiple portions or slices to reduce efficiency, latency, and bandwidth issues. The sizes of the slices can be standardized to be the same. The slices that make up a given resource can correspond to an HTTP range. In other words, the HTTP range further identifies a particular slice of the content data, given that the address of the content data (e.g., the URL) does not specific particular slices of the content data. Accordingly, the content request can further include a range of the content data in addition to the address of the content data. The range can be specified in a range header on the content request. The fill-buffer proxy engine 134 uses the range header as part of a key for deciding whether the request received at 314 corresponds to the same content data. In other words, the fill-buffer proxy engine 134 can determine whether any of the additional content requests is requesting the same content data based on the address and the HTTP range. In one example in which the fill-buffer proxy engine 134 is already filling or storing a full version of the content data (identified by the address of the content data) at the cache storage 136 where the content data has multiple slices/ranges, the content request received at 320 includes a range header that identifies a particular slice of the content data. The fill-buffer proxy engine 134 can identify that particular slice based on the range header and service the slice of the content data in the manner described from the full version stored in the cache storage 136.

At 322, the content data is provided to the additional client 102b via the fill-buffer proxy engine 134. In the example in which the additional content request identifies the same upstream node, the fill-buffer proxy engine 134 has already established a connection with the upstream node for processing the first content request with respect to the client 102a. The same connection between the fill-buffer proxy engine 134 and the upstream node can be leveraged to service the same content data to the additional request from the client 102b. In the example in which the content request identifies a different upstream node, the fill-buffer proxy engine 134 is configured to establish a connection with the different upstream node for receiving the content data.

In some embodiments, the block 322 includes timing out the request received at 314 and direct the client 102b to connect to the fill-buffer proxy engine 134 instead to receive the content data from the cache storage 136 while the cache lock is enabled at the cache storage 126. For example, responsive to determining that the fill is not completed and/or that the cache lock has not been disabled or released (316: NO), the request service engine 122 times out the request received at 314 (e.g., setting timeout=0) and sends the client 102b a message with an address (e.g., the IP address) of the fill-buffer proxy engine 134, indicating to the client 102b to connect to the fill-buffer proxy engine 134 for receiving the content data. The client 102b can connect to the fill-buffer proxy engine 134 and receives the content data stored in the cache storage 136.

In alternative embodiments, the block 322 includes the caching agent 120 receiving the content data via the port or connection established in the network 140a or 140b (as dedicated to the client 102b) for authentication and relaying the content data to the client 102b. In some examples, a dedicated tunnel can be established from the fill-buffer proxy engine 134 to the client 102b via the port or connection established for authentication and through the caching agent 120. The content data can be transferred from the fill-buffer proxy engine 134 to the client 102b via the dedicated tunnel.

The method 300a returns to block 314 as additional requests from additional ones of the clients 102a-102n are received by the caching agent 120 in the manner described. As described in further details herein, as long as there are requests for a given content being received, the fill-buffer proxy engine 134 maintains a copy of the content data in the cache storage 136 and maintains the upstream connection to the upstream node. Responsive to determining that no additional requests for the same content data are being received, the content data can be cleared from the cache storage 136, and the connection of the fill-buffer proxy engine 134 to the upstream node can be terminated.

Figure 3B:
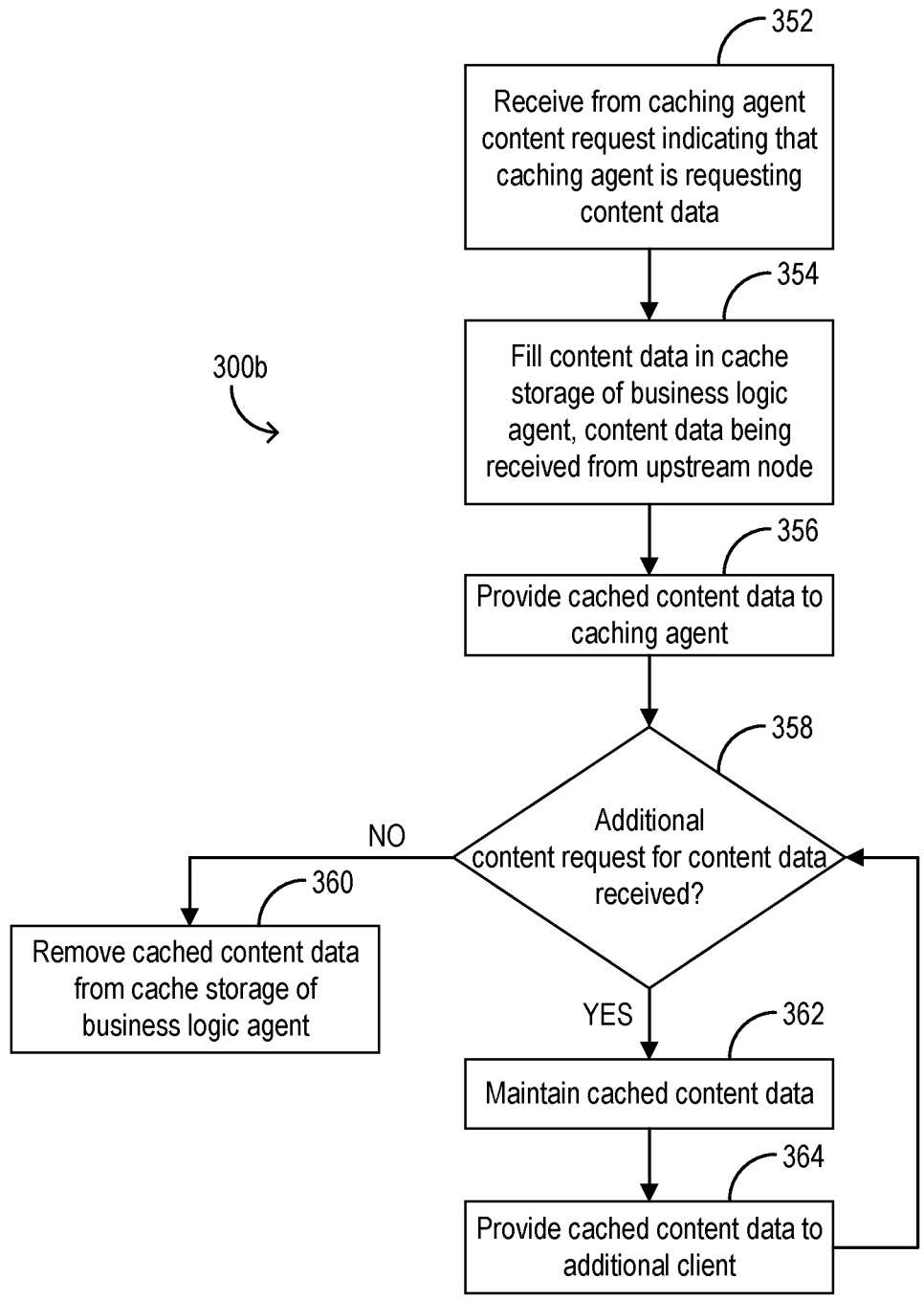
FIG. 3B is a flow diagram illustrating a method for managing caching for the content delivery system according to various embodiments.

FIG. 3B is a flow diagram illustrating a method 300b for managing caching for the content delivery system 100a or 100b according to various embodiments. Referring to FIGS. 1A-3B, the method 300b is concerned with leveraging the cache storage 136 of the fill-buffer proxy engine 134 for intelligent fill-buffering for the caching agent 120 with respect to content data for which the caching agent 120 has enabled a cache lock. The method 300b is performed by the business logic agent 130 and corresponds to the method 300a.

As described, the business logic agent 130 (e.g., the business logic engine 132) can receive an authentication request from the caching agent 120 (e.g., the request service engine 122) via the network 140a (e.g., via the opened port) or 140b (e.g., via the dedicated connection). The business logic engine 132 determines whether the content data requested by the client 102a belongs to a valid customer of the system 100a or 100b, whether the rules of the customer allow the content data to be serviced to the client 102a, whether the rules of the content delivery system 100a or 100b allow the content data to be serviced to the client 102a, and so on. The business logic engine 132 sends an authentication response to the request service engine 122. The authentication response indicates to the request service engine 122 whether the request received from the client 102a can be serviced (e.g., "yes" or "no"). In some examples, in addition to the indication of whether the request can be serviced, the authentication response can include metadata such as but not limited to, server ID, subscriber ID, cache key to use, and so on.

Whereas the caching agent 120 does not store a copy of the content data in the cache storage 126, the business logic agent (e.g., the fill-buffer proxy engine 134) receives from the caching agent 120 a content request indicating that the caching agent 120 is requesting content data for the client 102, at 352. In some examples, the content request includes an address of the content data and an address of an upstream node from which the content data is to be received/retrieved.

At 354, the fill-buffer proxy engine 134 fills the content data in the cache storage 136. The content data is received from the upstream node, the address of which is in the content request. For example, responsive to receiving the content request, the fill-buffer proxy engine 134 connects to the upstream node identified in the content request and receives the content data from the upstream node.

At 356, the fill-buffer proxy engine 134 provides the cached content data to the caching agent 120 (e.g., the caching engine 124). The fill-buffer proxy engine 134 begins to fill the content data in the cache storage 136 (e.g., at 354) and relays the content data to the caching agent 120 via the port or connection of the network 140a or 140b. Accordingly, the cache storage 126 is being filled with the content data from the upstream node via the fill-buffer proxy engine 134, which is acting as a proxy or relay between the upstream node and the edge node 110.

While the cache storage 126 is being filled with the content data, the business logic agent 134 (e.g., the fill-buffer proxy engine 134) maintains the cached content data in the cache storage 136 in response to receiving additional content requests from the caching agent 120. The additional content requests indicate that the caching agent 120 is requesting the same content data for additional clients.

In one example implementation, at 358, the business logic agent 134 (e.g., the fill-buffer proxy engine 134) determines whether an additional content request has been received from the caching agent 120. In some examples, the determination at 358 is based on a predetermined time period since the last content request for the same content data is received by the fill-buffer proxy engine 134. In other words, the cached content data is maintained in the cache storage 136 in response to determining that two consecutive ones of the additional content requests are received within a predetermined time interval or the content request received at 352 and an additional content request are received within a predetermined time interval. Examples of the predetermined time interval include but are not limited to, 1 s, 5 s, 1 s, 30 s, 1 m, 2 m, 10 m, and so on.

Implementing the predetermined time interval addresses a "race problem" which involves a situation where the fill using the cache storage 136 is completed, and the caching engine 124 has not released the cache lock (e.g., the fill using the cache storage 126 has not completed).

That is, the fill using the cache storages 126 and 136 may end at different times. In this situation, if the fill-buffer proxy engine 134 releases the content data from the cache storage 136 immediately after the fill being completed, the fill-buffer proxy engine 134 may need to establish a new connection to the upstream node and re-fill the cache storage 136. Accordingly, the predetermined time interval corresponds to a linger time before the fill-buffer proxy engine 134 releases the cached copy, thus providing efficient use of the cached copy to serve as many additional content requests as possible.

In response to determining that no additional content request for the same content data is received (358: NO), the business logic agent 134 (e.g., the fill-buffer proxy engine 134) can release the cached content data from the cache storage 136, at 360. That is, responsive to determining that no new additional content requests have been received for the predetermined time interval since a most recent one of the additional content requests has been received, the business logic agent 134 (e.g., the fill-buffer proxy engine 134) can release the cached content data from the cache storage 136, at 360.

On the other hand, in response to determining that an additional content request (corresponding to a request from the client 102b) for the same content data is received (358: YES), the business logic agent 134 (e.g., the fill-buffer proxy engine 134) maintains the cached data, a 362. That is, responsive to determining that a new additional content request has been received within the predetermined time interval since a most recent one of the additional content requests has been received, the business logic agent 134 (e.g., the fill-buffer proxy engine 134) maintains the cached content data, a 362.

As described, for each additional content request, a connection (port or dedicated connection) corresponding to that particular request is established in the network 140a or 140b. In some examples, so as long as a new port or dedicated connection is opened in the network 140a or 140b within the predetermined time interval since a last port or dedicated connection has been open, the fill-buffer proxy engine 134 maintains the cached content data in the cache storage 136. Each new port or dedicated connection can be used for communicating data between the caching agent 120 and the business logic agent 130 for authentication in the manner described. The block 362 is performed in response to successful authentication. The additional content request can be received using the same port or dedicated connection established for authentication.

The cached content data is provided by the fill-buffer proxy engine 134 to the client 102b at 364, while the cache storage 126 is being filled with the content data. Similar to the content request received at 352, the additional content request includes an address of the content data and an address of an upstream node from which the content data is to be received/retrieved. In some examples, the additional content request may also include a range header for distinguishing a slice of the content data in the manner described. Using the address of the content data, the address of the upstream node, and the range header (if any), the fill-buffer proxy engine 134 can identify the content data (or a portion thereof) and the node to retrieve the content data using the additional content request.

In the example in which the additional content request identifies the same upstream node, the fill-buffer proxy engine 134 has already established a connection with the upstream node for processing the first content request with respect to the client 102a. The same connection between the fill-buffer proxy engine 134 and the upstream node can be leveraged to service the same content data to the additional request from the client 102b. In the example in which the content request identifies a different upstream node, the fill-buffer proxy engine 134 is configured to establish a connection with the different upstream node for receiving the content data.

In some embodiments, the block 364 includes connecting directly to the client 102b (e.g., via a direct network connection without relaying through the caching agent 120) and sending, to the client 102b, the content data from the cache storage 136 while the cache lock is enabled at the cache storage 126. In alternative embodiments, the block 364 includes sending the content data to the caching agent 120 via the port or connection established in the network 140a or 140b (as dedicated to the client 102b) for authentication, so that the caching agent 120 can relay the content data to the client 102b. In some examples, the dedicated tunnel can be established from the fill-buffer proxy engine 134 to the client 102b via the port or connection established for authentication and through the caching agent 120. The content data can be transferred from the fill-buffer proxy engine 134 to the client 102b via the dedicated tunnel.

The method 300b returns to block 358 for determining whether any additional content requests have been received.

In some cases, another "race problem" may occur. This "race problem" concerns a situation in which the fill using the cache storage 126 is complete (e.g., servicing the request by the client 102a is completed by the caching agent 120), and the fill-buffering proxy engine 134 has not released the content data (e.g., the fill using the cache storage 136 for servicing the request by another one of the clients 102a-102n has not been completed). At this point, the cached content data stored at the cache storage 126 may be expired, may be invalidated, or may be in need of update/refresh for another suitable reason. In this case, a mechanism is needed to assure that the caching agent 120 does not send a new content request to the fill-buffer proxy engine 134 for a fill that the fill-buffer proxy engine 134 is already performing. That is, the mechanism is needed to prevent the fill-buffer proxy engine 134 to use an expired/invalidated copy of the content data for addressing the new content request.

As such, the content request received by the fill-buffer proxy engine 134 includes a fill ID in some embodiments. The fill ID indicates that a new, fresh, unexpired, and valid copy of the content data is requested by the caching agent 120 as the caching agent 120 currently has an outdated copy. The fill ID can be a header in the content request. A first fill ID indicates that any copy, even if not a new copy, of the content data can be used. A second fill ID indicates that a new copy of the content data needs to be used, so that the fill-buffer proxy engine 134 needs to retrieve the new copy of the content data from the upstream node using a new connection thereto. As such, the fill-buffer proxy engine 134 can determine that a new copy of the content data is needed based on the fill ID. The fill-buffer proxy engine 134 fills the new copy of the content data in the cache storage 136 in response to determining that the new copy is needed.

In some examples, the fill-buffer proxy engine 134, by using the fill ID header, does not need to implement any expiration logic of its own. This is true regardless of whether the fill-buffer proxy engine 134 is implementing very short-term caching. Even if the fill-buffer proxy engine 134 were doing long-term caching, using the fill ID header to differentiate content data requested means that once content data has expired, the fill-buffer proxy engine 134 requests a new copy of the content data (based on receiving a new fill ID), and the old (prior the fill ID) content data will then age out of the cache storage 136 given that the old content data is no longer being requested. Therefore, the fill ID header does not only solve a race, but also simplifies the processing in the fill-buffer proxy engine 134 by obviating the need for the fill-buffer proxy engine 134 to understand HTTP expiration.

In some embodiments, a conditional request header (or conditional header) can be used as a part of a key calculation. For example, responsive to the content copy being expired while being stored in the cache storage 126, the caching engine 124 makes a conditional request upstream for the content data. The conditional request carries an HTTP header indicating that the content data has expired, and that a new copy of the content data is needed if the content data has been changed since the expiration, and that if the content data has not been changed, a response indicative of the same is requested (so I can use the same). Traditionally, as the cache lock is disabled and the caching agent 120 is receiving multiple copies of the same content data, the caching agent 120 sends multiple conditional requests for the content data.

In present disclosure, the conditional request headers are included in the key logic for the fill-buffer proxy engine 134 for differentiating upstream fills, to ensure that the caching agent 120 can receive the response that the content data has not been changed from the fill-buffer proxy engine 134. In response to the fill-buffer proxy engine 134 determining that a full version of the content data is already being filled and that a conditional request is received as part of the content request, the fill-buffer proxy engine 134 responds to the content request in the manner described using the copy of the content data that is currently stored in the cache storage 136. In response to the fill-buffer proxy engine 134 determining that the content data is not being filled, and that a conditional request is received as part of the content request, then the fill-buffer proxy engine 134 uses the conditional request as a key (or as part of the key calculation).

The key is used for the fill-buffer proxy engine 134 to differentiate multiple content requests for multiple resources. For example, the fill-buffer proxy engine 134 calculates a key for each content request received. The key can be determined by running various parameters (such as but not limited to, the target upstream node from which the content data is to be retrieved, the host/client that is requested the content data, the address (e.g., URL) of the content data, the fill ID, an initial header, and so on) through a suitable key-generation function.

Accordingly, the content request includes a conditional request header. The fill-buffer proxy engine 134 determines a key corresponding to the content request based on the conditional request header.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, ASICs, FPGAs, DSPs, or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method for managing caching for a content delivery system, the method comprising:
   receiving, by a business logic agent from a caching agent, a content request indicating that the caching agent is requesting content data for a client, wherein the business logic agent and the caching agent are operatively coupled via a network;
   filling, by the business logic agent, the content data in a first cache storage of the business logic agent, wherein the content data is received from an upstream node of the content delivery system;
   providing, by the business logic agent, the cached content data to the caching agent; and
   while a second cache storage of the caching agent is being filled with the content data, maintaining, by the business logic agent, the cached content data in response to receiving additional content requests from the caching agent, wherein the additional content requests indicate that the caching agent is requesting the same content data for additional clients, wherein the content request comprises an address of the content data and a range of the content data;
   the address of the content data comprises a Uniform Resource Locator (URL); and
   the business logic agent determines whether any of the additional content requests is requesting the same content data as requested by the content request based on the address and the range.

2. The method of claim 1, wherein
   the content delivery system is a content delivery network (CDN);
   the business logic agent and the caching agent are on a same edge node of the CDN;

the upstream node is an origin server that stores the content data or a node between the edge node and the origin node in the CDN that stores the content data; and the network is a local host connection.

3. The method of claim 2, wherein the local host connection is over at least one of a hypertext transfer protocol (HTTP) connection and a HTTP/2 connection.

4. The method of claim 1, wherein
the content delivery system is a content delivery network (CDN);
the caching agent is on an edge node of the CDN;
the business logic agent is on an intermediate node of the CDN, wherein the intermediate node is different from the edge node; and
the upstream node is an origin server that stores the content data or a node between the edge node and the origin node in the CDN that stores the content data.

5. The method of claim 1, wherein
the caching agent comprises a hypertext transfer protocol (HTTP) service engine configured to service HTTP requests received from clients; and
the caching agent comprises a caching engine, wherein the caching engine comprises the second cache storage.

6. The method of claim 1, further comprising:
receiving, by the business logic agent from the caching agent, an authentication request before the content request is received;
authenticating that the content data is provided by a customer of the content delivery system; and
sending, by the business logic agent to the caching agent, an authentication response in response to authenticating that the content data is provided by the customer, wherein the authentication response comprises an authorization.

7. The method of claim 1, wherein
the content request identifies the upstream node; and
the business logic agent receives the content data from the upstream node based on the content request.

8. The method of claim 1, wherein the content request is addressed to the upstream node.

9. The method of claim 1, wherein the content request comprises a fill identification (ID), and the method further comprises:
determining, by the business logic agent, that a new copy of the content data is needed based on the fill ID; and
filling, by the business logic agent, the new copy of the content data in the first cache storage in response to determining that the new copy is needed.

10. The method of claim 1, wherein the content request comprises a conditional request header, and the method further comprises:
determining, by the business logic agent, a key corresponding to the content request based on the conditional request header.

11. The method of claim 1, wherein while the second cache storage of the caching agent is being filled with the content data, maintaining the cached content data comprises maintaining the cached content data in response to determining that two consecutive ones of the additional content requests are received within a predetermined time interval.

12. The method of claim 1, further comprising determining that no new additional content requests have been received for a predetermined time interval since a most recent one of the additional content requests has been received.

13. A method for managing caching for a content delivery system, the method comprising:

receiving, by a caching agent from a client, a request for content data;
determining, by the caching agent, that the caching agent needs to fill the content data;
sending, by the caching agent to a business logic agent, a content request indicating that the caching agent is requesting the content data for the client, wherein the business logic agent and the caching agent are operatively coupled via a network, and the business logic agent fills the content data in a first cache storage of the business logic agent responsive to the content request;
filling, by the caching agent, the content data from an upstream node in a second cache storage of the caching agent;
receiving, by the caching agent, additional content requests from additional clients, wherein the additional content requests indicate that the same content data is requested by additional clients; and
while the second cache storage is being filled with the content data, the cached content data is provided by the business logic agent to the additional clients, wherein the content request comprises an address of the content data and a range of the content data;
the address of the content data comprises a Uniform Resource Locator (URL); and
the business logic agent determines whether any of the additional content requests is requesting the same content data as requested by the content request based on the address and the range.

14. The method of claim 13, wherein
the content delivery system is a content delivery network (CDN);
the business logic agent and the caching agent are on a same edge node of the CDN;
the upstream node is an origin server that stores the content data or a node between the edge node and the origin node in the CDN that stores the content data; and
the network is a local host connection.

15. The method of claim 14, wherein the local host connection is over at least one of a hypertext transfer protocol (HTTP) connection and a HTTP/2 connection.

16. The method of claim 13, wherein
the content delivery system is a content delivery network (CDN);
the caching agent is on an edge node of the CDN;
the business logic agent is on an intermediate node of the CDN, wherein the intermediate node is different from the edge node; and
the upstream node is an origin server that stores the content data or a node between the edge node and the origin node in the CDN that stores the content data.

17. The method of claim 13, wherein
the caching agent comprises a hypertext transfer protocol (HTTP) service engine configured to service HTTP requests received from clients; and
the caching agent comprises a caching engine, wherein the caching engine comprises the second cache storage.

18. The method of claim 13, further comprising:
sending, by the caching agent to the business logic agent, an authentication request before the content request is sent;
receiving, by the caching agent from the business logic agent to an authentication response, wherein the authentication response comprises an authorization.

19. The method of claim 13, further comprising selecting, by the caching agent, the upstream node, wherein the content request identifies the upstream node.

20. The method of claim 13, wherein the content request is addressed to the upstream node.

21. The method of claim 13, wherein the content request comprises a fill identification (ID), and the fill ID indicates whether a new copy of the content data is needed to be filled in the first cache storage of the business logic agent.

22. The method of claim 13, wherein the content request comprises a conditional request header, wherein a key corresponding to the content request is determined by the business logic agent based on the conditional request header.

23. A node of a content delivery system, comprising:
a network device providing a network;
at least one processor implementing a business logic agent and a caching agent, the business logic agent and the caching agent are operatively coupled via the network; and
at least one memory implementing a first cache storage of the business logic agent and a second cache storage of the caching agent, wherein the at least one processor:
sends, using the caching agent to the business logic agent, a content request indicating that the caching agent is requesting content data for a client;
receives, using the business logic agent, the content data from an upstream node of the content delivery system;
fills, using the business logic agent, the content data in the first cache storage;
provides, using the business logic agent, the cached content data to the client; and
while the second cache storage is being filled with the content data, maintains, using the business logic agent, the cached content data in response to the business logic agent receiving additional content requests from the caching agent, wherein the additional content requests indicate that the caching agent is requesting the same content data for additional clients, wherein
the content request comprises an address of the content data and a range of the content data;
the address of the content data comprises a Uniform Resource Locator (URL); and
the business logic agent determines whether any of the additional content requests is requesting the same content data as requested by the content request based on the address and the range.

24. A non-transitory computer-readable medium comprising computer-readable instructions such that, when executed, cause a processor of a node of a content delivery system to:
send, using a caching agent to a business logic agent, a content request indicating that the caching agent is requesting content data for a client;
receive, using the business logic agent, the content data from an upstream node of the content delivery system;
fill, using the business logic agent, the content data in the first cache storage;
provide, using the business logic agent, the cached content data to the client; and
while the second cache storage is being filled with the content data, maintain, using the business logic agent, the cached content data in response to the business logic agent receiving additional content requests from the caching agent, wherein the additional content requests indicate that the caching agent is requesting the same content data for additional clients, wherein
the content request comprises an address of the content data and a range of the content data;
the address of the content data comprises a Uniform Resource Locator (URL); and
the business logic agent determines whether any of the additional content requests is requesting the same content data as requested by the content request based on the address and the range.

* * * * *